United States Patent
Dunn et al.

(10) Patent No.: US 8,195,121 B2
(45) Date of Patent: Jun. 5, 2012

(54) METHOD AND SYSTEM FOR ESTABLISHING MESSAGING COMMUNICATION WITH A SERVICE PROVIDER, SUCH AS A PSAP (PUBLIC SAFETY ANSWERING POINT)

(75) Inventors: Timothy N. Dunn, Issaquah, WA (US); Declan Farrell, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 433 days.

(21) Appl. No.: 12/253,890

(22) Filed: Oct. 17, 2008

(65) Prior Publication Data
US 2010/0069099 A1     Mar. 18, 2010

Related U.S. Application Data

(60) Provisional application No. 61/097,182, filed on Sep. 15, 2008.

(51) Int. Cl.
*H04M 11/04* (2006.01)

(52) U.S. Cl. .............. 455/404.1; 455/404.2; 455/466; 455/456.1

(58) Field of Classification Search .......... 455/404.2, 455/466, 456.1–456.6, 404.1; 379/37–51
See application file for complete search history.

(56) References Cited

U.S. PATENT DOCUMENTS

| | | | |
|---|---|---|---|
| 6,256,489 B1 * | 7/2001 | Lichter et al. | 455/404.2 |
| 6,922,565 B2 | 7/2005 | Rhodes et al. | |
| 6,940,950 B2 | 9/2005 | Dickinson et al. | |
| 7,260,186 B2 | 8/2007 | Zhu et al. | |
| 7,340,241 B2 | 3/2008 | Rhodes et al. | |
| 2007/0172035 A1 * | 7/2007 | Sussman et al. | 379/37 |
| 2007/0173224 A1 * | 7/2007 | Buckley et al. | 455/404.1 |
| 2008/0045250 A1 * | 2/2008 | Hwang | 455/466 |
| 2008/0132197 A1 * | 6/2008 | Koepke | 455/404.2 |
| 2009/0156237 A1 * | 6/2009 | Hwang | 455/466 |
| 2009/0227225 A1 * | 9/2009 | Mitchell et al. | 455/404.2 |
| 2009/0227253 A1 * | 9/2009 | Hwang | 455/432.2 |

OTHER PUBLICATIONS

Partridge, Kurt et al., "TiltType: Accelerometer-Supported Text Entry for Very Small Devices," User Interface Software and Technology—UIST, pp. 201-204, 2002.

Winton, Richard, "LAPD plans to accept 911 text messages," Los Angeles Times, Jun. 13, 2007, © 2011 Los Angeles Times.

Partridge, Kurt et al., "TiltType: Accelerometer-Supported Text Entry for Very Small Devices," Computer Science and Engineering; University of Washington; Seattle, WA, USA.

Phonemag.com—Archive, http://www.phonemag.com/tags/accelerometer; p. 2, [Internet accessed Sep. 29, 2008].

Templeton, Brad, "Accelerometer in Cell Phone for Emergencies," http://ideas.4brad.com/archives/000056.html, pp. 1-2 [Internet accessed on Sep. 28, 2008].

* cited by examiner

*Primary Examiner* — Kamran Afshar
*Assistant Examiner* — Dung Lam

(57) ABSTRACT

Described in detail herein is a system and method for allowing a device, such as a cell phone, to establish a messaging dialogue with a service provider, such as SMS messaging with a 911 call center. Furthermore, the service provider can receive location data of the mobile device. Further details and features are described herein.

30 Claims, 3 Drawing Sheets

| PSAPs (e.g., 911 call center) | Coverage Area | Routing number (e.g., telephone number or short code) | E-mail |
|---|---|---|---|
| PSAP-1 | Sector 1 | 123456 | PSAP1@city1.gov |
| PSAP-2 | Sector 2 | 123-456-7891 | PSAP2@city2.gov |
| PSAP-3 | Sector 3 | 345678 | PSAP3@city3.gov |
| ... | ... | ... | ... |
| PSAP-n | Sector n | 987654 | PSAPn@cityn.gov |

*FIG. 1B*

METHOD AND SYSTEM FOR ESTABLISHING MESSAGING COMMUNICATION WITH A SERVICE PROVIDER, SUCH AS A PSAP (PUBLIC SAFETY ANSWERING POINT)

CROSS-REFERENCE TO RELATED APPLICATION

This application claims the benefit of the assignee's U.S. Provisional Patent Application No. 61/097,182, filed on Sep. 15, 2008.

BACKGROUND

Mobile devices, such as wireless and cordless phones, handheld computers, smartphones, and media players, among others, have become ubiquitous. Most mobile devices, if not all, have messaging capabilities, such as text messaging via SMS (Short Message Service) and multimedia messaging via MMS (Multimedia Message Service). Indeed, many non-mobile devices, such as computers and "landline" phones, have messaging capabilities, including SMS and MMS. SMS and MMS have become popular modes of communication among users of such devices. SMS and MMS are effective methods for device users to communicate with others without talking. Nonverbal communications, such as SMS and MMS, may be preferable to voice communications during meetings, ceremonies, concerts or other events when voice communication is either prohibited, undesirable, or hampered due to the loudness of the event.

Voice communication may be particularly undesirable in an emergency situation if, for instance, the device user is involved in an automobile accident and is unable to speak or is unable to raise the device to his or her ear or mouth, or if the device user is in the presence of a perpetrator and may be endangered if he or she initiates a voice communication to a PSAP.

According to CTIA (Cellular Telecommunications Industry Association), an increasing number of mobile device users are dialing 9-1-1 every day. Currently, a mobile device user can establish an SMS dialogue with a PSAP by sending an SMS message directly to an SMS number associated with the PSAP, but PSAPs that have text messaging capabilities have different SMS numbers for initiating the SMS dialogue. Thus, the device user cannot simply dial 9-1-1 to reach the PSAP, but must identify the specific PSAP covering the area in which he/she is located and then determine the SMS number associated with that PSAP. For example, if the device user wishes to communicate with the PSAP but remain silent during the communication (e.g., under the circumstances it may be unsafe for the user to talk to the PSAP), he/she would have to identify the PSAP that covers the area in which he/she is located and then determine the SMS number associated with the PSAP. The SMS dialogue can be established only when the SMS number of the specific PSAP that serves the user's area is actually known to the user.

The need exists for a method and system that overcomes these problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 1B is a table within or accessible to the location center, such as a GMLC (Gateway Mobile Location Center), of the communication system.

Figure 1A:
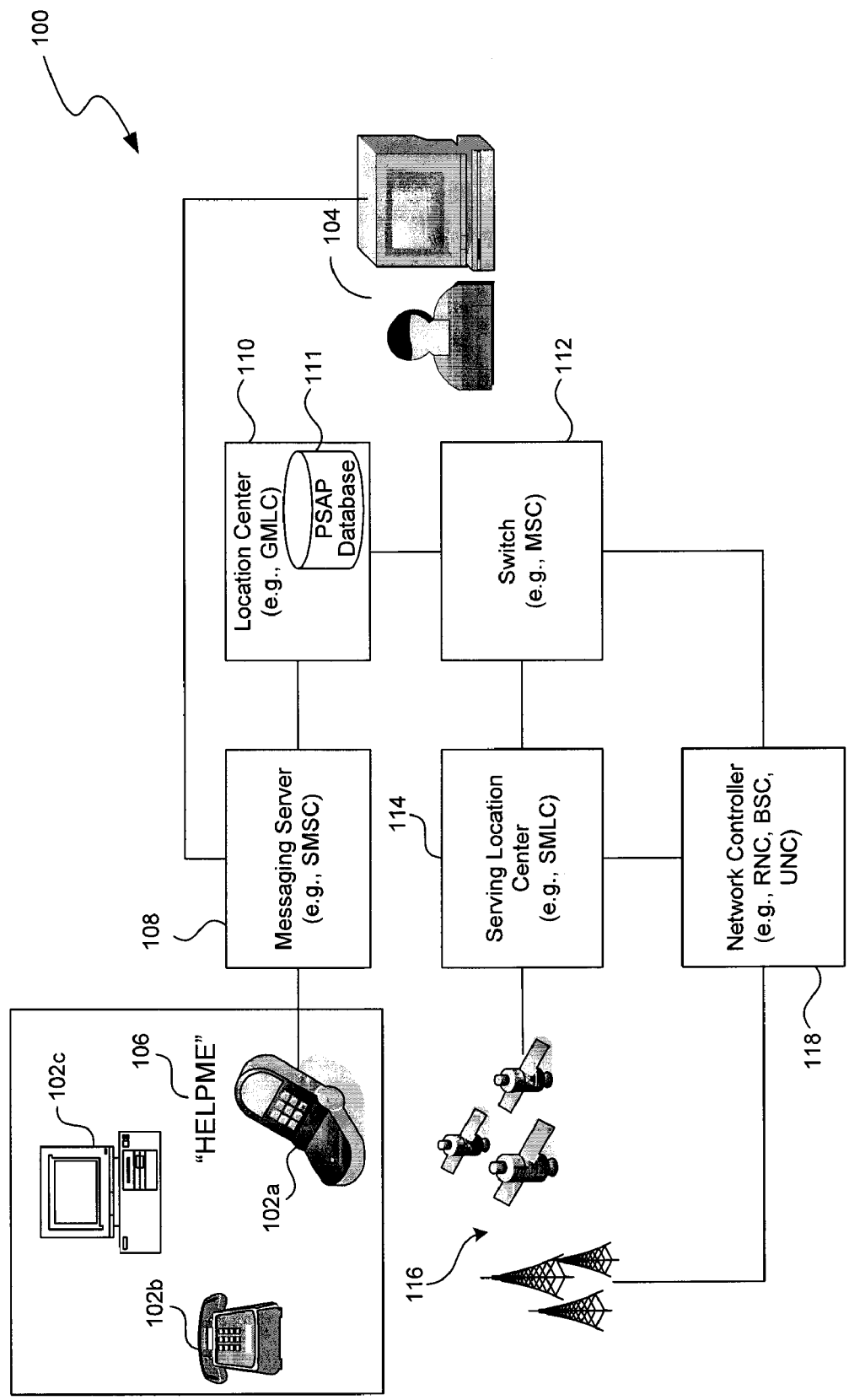
FIG. 1A is a block diagram illustrating a communication system operable to implement aspects of the invention.

The headings provided herein are for convenience only and do not necessarily affect the scope or meaning of the claimed invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 202 is first introduced and discussed with respect to FIG. 2).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention incorporates many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

System Description

FIG. 1 and the following discussion provide a brief, general description of a suitable environment in which the invention can be implemented. Although not required, aspects of the invention are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While aspects of the invention, such as certain functions, are described as being performed exclusively or primarily on a single device, the invention can also be practiced in distributed environments where functions or modules are shared among disparate processing devices, which are linked through a communications network, such as a Local Area Network (LAN), Wide Area Network (WAN), or the Internet.

In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively or additionally, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

FIG. 1A shows a communication system 100 for routing messages from a device 102 to a service provider 104, in this case a PSAP (Public Safety Answering Point). The device 102 may, for example, be a mobile device 102a such as a cellphone, cordless phone, or the like, a landline or VoIP phone 102b, a computer 102c, and/or any other similar device). In the example, an SMS (Short Message Service) message is sent from the device 102 (e.g., wireless and cordless phones, handheld computers, smartphones, media players, and the like) to a 911 call center 104. It will be appreciated by those skilled in the art that other means of non-voice communication such as MMS (Multimedia Messaging Service), electronic mail (email), IM (instant messaging), IP Multimedia Subsystem (IMS), and Morse code may be implemented using the same or alternative network components or a combination thereof which fall within the scope of aspects of the invention described herein.

According to one aspect of the invention, the device 102 may include an accelerometer (not shown) and related software process. The accelerometer and software process may be operable to detect movement of the device 102 and convert such movement into text or signals. For example, the device user having the device 102 in hand may implement gestures in the form of sign language, Morse code or the like. The accelerometer and software process may convert these gestures into text, which may ultimately be sent to the service provider 104 via e.g., SMS or MMS message, email or IM. In other words, the software process would receive movement signals from the accelerometer, compare them to a stored dictionary of words mapped to certain movement signals, and provide a best match between the received movement signals and the stored dictionary of signals to identify the corresponding word.

The communication system 100 establishes a messaging dialogue between the device 102 and the service provider 104 in response to an initial message request sent from the device 102 via a short code string 106. As presented in FIGS. 1A and 1B, the short code "HelpMe" (435763) is used to establish a messaging dialogue with a PSAP. In the context of emergency messaging to a PSAP, the short code string 106 may, for example, be a number or string that is defined by NENA (National Emergency Number Association) or any similar organization or agency. A single selected or predetermined short code, or small number of codes may be adopted nationally or internationally for uniformity among users, carriers and geographic boundaries, for emergency purposes.

In addition, software resident on the device 102 may enable short code correction, such that, for example, an erroneous entry of "435766" instead of "435763" or any other erroneous entry substantially similar to the short code string 106 (e.g., "HelpMe" or "435763") is automatically corrected and a messaging dialogue may be established with the PSAP via the corrected 435763 short code. Similarly, the software resident on the device 102 may enable translation of alternate short codes, each of which is intended to initiate a specific messaging dialogue with the service provider 104, to the correct or enabled short code. For example, the software resident on the device 102 may automatically translate any one of "SAVEME" (728363), "NEEDHELP" (63334357) and "INJURED" (4658733) to 435763, and the device 102 will initiate a messaging dialogue using the 435763 short code. Alternatively and/or additionally, the software may be resident on a messaging server 108 or any other telecommunications network component such that the short code correction and/or translation of alternate short codes may occur on the telecommunications network side. The messaging server 108 is described in detail below.

According to one aspect of the invention, a shortcut key to the short code string 106 may be programmed into the device 102 by the device user, or programmed or hardwired into the device 102 by the device manufacturer or wireless telecommunications carrier. The shortcut key allows for a quicker initiation of the messaging dialogue with the service provider 104. Alternatively or additionally, the device may employ a simple key combination to send the short code string or similar signal.

One or more service providers 104 may typically serve a particular region (e.g., a neighborhood, district, city, state, or country). The service provider 104 used to communicate with the device 102 via messaging may be selected based on a location from which the device 102 initiates the message dialogue. Since the particular service provider 104 used for messaging communication varies based on device location, it may be desirable to establish a single short code to be applicable for all service providers 104 in the region. Having a single short code for establishing messaging communication with respective ones of the service providers 104 that service a specific region (e.g., a country, multiple countries, or continent), provides a preferable user experience, because it eliminates the device 102 user's need to identify the particular service provider 104 that services the device 102 and determine a unique number associated with that service provider. For example, the uniformity of the short code allows the device user to establish the messaging dialogue in an emergency situation, where the device 102 user neither has sufficient time nor ability to identify the actual service provider 104 that covers the user's location and determine its number.

The communication system 100 comprises a messaging server 108 (such as a Short Messaging Service Center or SMSC), a location center 110 (such as a Gateway Mobile Location Center or GMLC), a switch 112 (such as a Mobile Switching Center or MSC), serving location center 114 (such as a Serving Mobile Location Center (SMLC) or serving location center), and a device location system 116 (in this case, a GPS (Global Positioning System) system incorporating GPS satellites). All of these components are known within the telecommunications industry. Although FIG. 1A illustrates a GSM (Global System for Mobile Communications) embodiment, the invention is applicable to other wireless telecommunications technologies, including UMA/GAN (Unlicensed Mobile Access/Generic Access Network), CDMA (Code Division Multiple Access), UMTS (Universal Mobile Telecommunications System), EDGE (Enhanced Data for GSM Evolution), LTE (Long Term Evolution), Wimax (Worldwide Interoperability for Microwave Access), Voice Over Internet Protocol (VoIP), Unlicensed Mobile Access (UMA/GAN), and other technologies. Similarly, although a GPS location system is illustrated in FIG. 1A, any type of location technology may be utilized, such as A-GPS (Assisted GPS), TDOA (Time Difference of Arrival), WiFi triangulation, ATI, Secure User Plane Location (SUPL), and other technologies.

Cellular networks may additionally incorporate picocells, which are smaller base stations typically with shorter wireless range and incorporated into residential or business premises to provide local coverage to the residence or business. Picocells may be directly connected to the cellular network and therefore appear as cell sites with their own Cell Global Identity (CGI) values on the network.

An IP-based network is any IP-based telecommunications network, including both wired and wireless networks. For instance, a Voice Over Internet Protocol (VoIP) network is any wired or wireless network in which voice communications are "packetized" for transmission over the Internet. UMA networks and femtocell networks similar to VoIP networks, in that voice communications are packetized and transmitted over the Internet. UMA networks typically feature WiFi access points for receiving and sending voice communications over unlicensed spectrum; femtocell networks typically feature wireless access points broadcasting within licensed spectrum of a telecommunications service provider, with conversion of voice communications into IP packets for transmission over the Internet.

The messaging server (in this example, an SMSC) 108 allows messages, such as SMS messages, to be exchanged between devices and other networks. Among other functions, the messaging server 108 stores and forwards outgoing messages, and receives and forwards incoming messages. In this case, the messaging server 108 receives the message request and is configured to identify that the short code string 106 (e.g., 435763 or "HelpMe") as a request to initiate a messaging dialogue with a service provider (e.g., a PSAP), saves a copy of the message in memory, and routes the message to the location center 110. The messaging server 108 may use SMPP (Short Message Peer-to-Peer Protocol) to route the SMS message request to the location center 110. SMPP is an SMS protocol for exchanging SMS messages between SMS peer entities such as SMSCs 108. If SMPP is used to route the SMS request to the location center 110, the location center 110 may be enhanced to accept this SMPP messaging (i.e., the SMS request by way of SMPP) or a server similar to the location center 110 may be employed for this purpose.

The location center 110 receives the SMPP messaging. The SMPP messaging includes a device number or other identifier associated with the device 102 along with the short code string 106 (i.e., 435763 or "HelpMe"). A terminated location request (MTLR), signal or message is implemented based on the device number of the device 102 and on the short code string 106. In particular, the location center 110 or similar platform initiates a request for location or a PSL (Provide Subscriber Location) request to the switch 112. The switch 112 is a switch providing services and coordination between users in a telecommunications network and external telecommunications networks. The switch 112 then initiates a PLRQ (provide location request) message to the serving location center 114.

Depending on the network technology of the communication system 100, the switch 112 may initiate the PLRQ through network controller 118. For example, in a UMTS (Universal Mobile Telecommunications System) network, the network controller 118 may be a Radio Network Controller (RNC). The RNC carries out system level control of co-channel interference and other radio transmission characteristics in wireless communication systems, for example, cellular networks, wireless networks and broadcasting systems. In a GSM network, the network controller 118 may be a Base Station Controller (BSC). The BSC is a device that manages radio resources at one or more BTSs (Base Transceiver Stations), for specified cells within a PLMN (Public Land Mobile Network). In a UMA/GAN network, the network controller 118 may be a UNC. The UNC is a device that manages radio resources at one or more access points. If the system 100 implements UMTS (Universal Mobile Telecommunications System) technology, the RNC is used to request the device 102 location. If the system 100 implements GSM, the BSC is used to request the device 102 location request. If the system 100 implements UMA/GAN, the UNC is used to request the device 102 location request. Alternatively, the switch 112 may directly request the device 102 location from the serving location center 114.

The serving location center 114 obtains a location (i.e., latitude and longitude coordinates) of the device 102 by way of the device location system 116 including various locator technologies. Although GPS satellites are illustrated in FIG. 1A, the locator technologies include any type of device location technology, such as one or more transponders, TDOAs, cellular base stations or WiFi triangulation. The serving location center 114 returns a PLRS (provide location response) message to the switch 112 (or through the network controller 118 to the switch 112), indicating the location of the device 102. In response, the switch 112 returns a PSL acknowledgement to the location center 110. Alternatively or additionally, e.g., if a suitable location is not available, the location center 110 could use a Cell Global Identity (CGI) protocol or similar location identity protocol as a basis for routing.

The location center 110 has or accesses a table 120 of service provider 104 locations stored in a database 111. As shown in FIG. 1B, the table 120 in the database 111 may be enhanced to include routing numbers 122, such as telephone numbers or short codes, for respective service providers 104. The routing numbers 122 include numbers or strings associated with respective messaging enabled service providers 104 (i.e., service providers 104 that can dialogue with a device through messaging). The table 120 may additionally include a list of coverage areas 124 associated with the service providers 104. For example, the coverage areas 124 of the service providers 104 may be divided into one or more regions or sectors (sector 1, sector 2, sector 3, ... sector n). Each of these regions or sectors may represent an area of coverage for a respective service provider 104.

The location center 110 may compare the determined location of the device 102 to the one or more sectors in the table 120 to select the respective sector that includes the device location. The service provider 104 associated with the selected sector from the table 120 is then determined to be the local service provider 104 that serves the device 102 initiating the messaging request. The location center 110 may also have service providers defined geospatially and perform a point in polygon or like lookup of the service provider. Further details on locating service providers geospatially may be found in the assignee's U.S. patent application Ser. No. 12/253,886, entitled Geographic Targeting of Alerts, filed concurrently herewith. The location center 110 selects the routing number 122 associated with the local service provider 104 of the device 102 and this routing number 122 is used to initiate a message session with the local service provider 104.

If the local service provider 104 that serves the device 102 cannot be determined, the location center 110 would return a failure message to the managing server 108 for delivery to the device 102. The local service provider 104 may not be determined if, for example, the local service provider 104 does not provide support for messaging or no service provider 104 entry was found in the table.

According to one embodiment of the invention, the location information as determined by the serving location center 114 is embedded in the message request that is forwarded to the messaging server 108 (e.g., the location center 110 may embed the location information into the message request that is forwarded to the messaging server 108). Alternatively or additionally, a further message including the location information of the device 102 is created and sent subsequently to the message request (e.g., the location center 110 may create the subsequent message and forward to the messaging server 108 for routing to the respective service provider) to the messaging server 108.

According to one embodiment of the invention, the routing table 120 may include one or more additional columns of alternative routing information associated with the service provider 104. For instance, an email column 126 may set forth the e-mail addresses for the respective service providers 104. If a service provider lacks a routing number 122 (such as an SMS or MMS address), but has an e-mail address, the location center 110 may return the appropriate e-mail address to the messaging server 108 for additional processing. Alternatively or additionally, the location center 110 may include a POP client enabling it to directly reformat or transcode the message (e.g. an SMS message or MMS message) as an e-mail, and then transmit the reformatted e-mail to the relevant service provider 104.

The messaging server 108 routes the message request, as received from the location center 110, to the local service provider 104 by way of the determined routing number. Additionally, the messaging server 108 may route the further message, which includes the location information of the device 102, to the local service provider 104 by way of the same routing number used to route the message request. In response to the local messaging enabled service provider 104 receiving the message request from the device 102, messages can directly be exchanged now between the device 102 and the service provider 104. While the above example describes communications or exchanges with a PSAP or emergency 9-1-1 call center, any service provider may be employed, including directory assistance (e.g. 4-1-1 services), subscriber assistance and customer support services (e.g. 6-1-1 services), and even non-telecommunications related services.

Example Process/Call Flow

Figure 2:
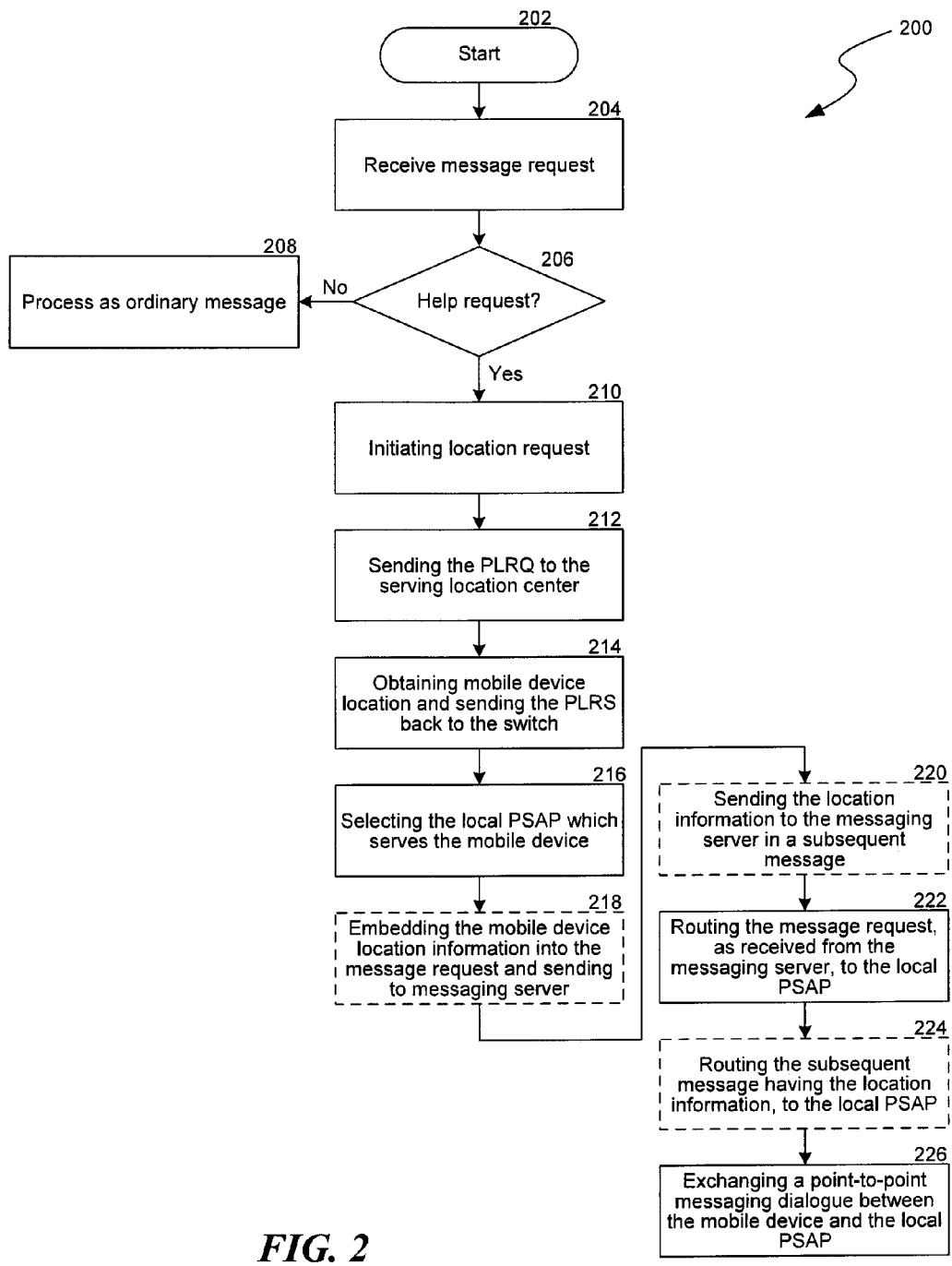
FIG. 2 is a flow chart illustrating a method for establishing a messaging dialogue between a mobile device and a service provider.

FIG. 2 shows a flow diagram of a method 200 performed by the system 100 of FIG. 1 to establish a messaging dialogue between a device 102 and the service provider 104.

The method starts at block 202, which in this example is in response to receipt of a message request from a device 102 user. The message request may, for example, be sent to the short code string 106, such as "HelpMe" (435763), although other defined short code strings may be used. At block 204, the message request is received by the messaging server 108 that is associated with the device 102. At block 206, the messaging server 108 determines whether the message request is a request for help to be routed to the local service provider based upon an analysis of the short code string 106.

If the messaging server 108 determines that the short code string 106 is not a help request but is a standard message request to a destination device, e.g., in another network, the messaging server 108 may forward the message request to a messaging server of the other network which serves the destination device. The messaging server of the other network may then establish a messaging dialogue between the device 102 and the destination device, as is known to those skilled in the art (block 208).

If the message request is a help request, the message request is forwarded to the location center 110. For example, the messaging server 108 compares the received short code string 106 or other received signal to one or more stored short code strings (e.g., numbers, strings, or signals) for help requests to check if the received message should be forwarded to a service provider. A location request is initiated by the location center 110 upon receipt of the message request from the messaging server 108. The location center 110 initiates the location request by sending the PSL request to the switch 112 (block 210). In response to the PSL, the switch 112 sends the PLRQ to the serving location center 114 through the network controller (e.g. a RNC in a UMTS network; a BSC in a GSM network; a UNC in a UMA/GAN network) (block 212).

In response to the PLRQ, the serving location center 114 obtains the location information of the device 102 through the device location system 116. The PLRS, indicating the device 102 location, is sent back to the switch 112 for routing to the location center 110 (block 214).

Based on the determined device 102 location, the location center 110 selects the local service provider 104, from the service provider 104 table stored in the location center 110, which serves the location of the device 102 initiating the message request. The routing number, such as the telephone number or short code, associated with the service provider 104 is selected from the table and sent back to the messaging server 108 with the message request (block 216).

Optionally, the location center 110 may embed the location information in the message request and send the message request with the embedded location information back to the messaging server 108 (block 218). Alternatively, the location center 110 may subsequently send an additional message, which includes the location information of the device 102, to the messaging server 108 for forwarding to the local service provider 104 (block 220).

The message request, as received from the location center 110 (i.e., the message request may optionally include the location information), is routed to the service provider 104 by way of the routing number selected from the service provider 104 table (block 220). Optionally, the subsequent message having the location information may be additionally routed to the service provider 104 by way of the same routing number used to route the message request (block 222). At block 224, a point-to-point messaging dialogue is exchanged between the device 102 and the local service provider 104 upon receipt of the message request.

The method passes control to 202 and waits for receipt of another message request by the messaging server 108 to establish a messaging dialogue with a service provider.

The method 200 may include additional acts, may omit some of the above-described acts and/or may perform acts in a different order than set out in the flow diagram. For example, other communications may be exchanged once the communications between the service provider 104 and the device 102 is established. For example, the user could send a digital image to the service provider 104 if the device 102 included a digital camera. Other communications described herein may be performed.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while aspects of the invention are described above with respect to capturing and routing digital images, any other digital content may likewise be managed or handled by the system provided herein, including video files, audio files, and so forth. While processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the invention provided herein can be applied to other systems, not necessarily the system described above. The elements and acts of the various examples described above can be combined to provide further implementations of the invention.

Other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A method of providing text-based public service help to subscribers of mobile telecommunications services, wherein the subscribers operate mobile telecommunications devices within a wireless network, and wherein the wireless network is coupled to multiple geographically separated Public Service Answering Points (PSAPs), the method comprising:
   determining whether a received text-based message is a request for public service help,
      wherein the request for public service help is selected from a plurality of different types of requests for public service help,
      wherein the received text-based message is associated with a user-input numeric or alphanumeric string,
      wherein the user-input numeric or alphanumeric string is a mobile phone short code having more than 3 digits or characters,
      wherein the received text-based message and the user-input numeric or alphanumeric string are received from a mobile telecommunications device,
      wherein the determining includes identifying whether the user-input numeric or alphanumeric string is substantially similar to a previously defined numeric or alphanumeric string, and
      wherein neither the user-input numeric or alphanumeric string nor the previously defined numeric or alphanumeric string are a phone number;
   obtaining geographic location information associated with a geographic location of the mobile telecommunications device;
   based on the obtained geographic information, identifying a one of the multiple geographically separated PSAPs that is designated to serve the mobile telecommunications device; and
   forwarding the text-based message to the one PSAP that is designated to serve the mobile telecommunications device,
      wherein the obtained geographic information is embedded in the text-based message forwarded to the one PSAP.

2. The method of claim 1 wherein the text-based message is a short messaging service (SMS) message, electronic mail message, or an instant message (IM).

3. The method of claim 1 wherein the previously defined numeric or alphanumeric string is 435763.

4. The method of claim 1, further comprising, after the forwarding, routing the obtained location information to the one PSAP that is designated to serve the mobile telecommunications device.

5. The method of claim 1 wherein the identifying includes identifying a routing number, telephone number or short code associated with the one PSAP that is designated to serve the mobile telecommunications device, and wherein the forwarding includes forwarding the text-based message based on the identified routing number, telephone number or short code.

6. The method of claim 1 wherein the identifying includes querying a database for latitude and longitude coordinates associated with street addresses for customer premises wireless equipment in communication with the mobile telecommunications device, wherein the customer premises equipment includes a femtocell, a picocell or an IEEE 802.11 access point.

7. The method of claim 1, further comprising after the forwarding, exchanging point-to-point text-based messages between the mobile telecommunications device and the one PSAP that is designated to serve the mobile telecommunications device, wherein the point-to-point text-based messages comprise customizable messages that communicate information other than confirmation of receipt of user messages.

8. A system configured to route messages from a device to one of multiple geographically separated service providers, the system comprising:
- means for determining whether a received message is a request for a service,
  - wherein the received message is associated with a user-input numeric or alphanumeric string,
  - wherein the user-input numeric or alphanumeric string is a mobile phone short code having more than 3 digits or characters,
  - wherein the received message and the user-input numeric or alphanumeric string are received from the device,
  - wherein the means for determining includes means for identifying whether the user-input numeric or alphanumeric string is substantially similar to a stored previously defined numeric or alphanumeric string, and
  - wherein neither the user-input numeric or alphanumeric string nor the previously defined numeric or alphanumeric string are a phone number input at the device to establish a voice call;
- means for obtaining geographic location information associated with a geographic location of the device,
- means for identifying a one of the multiple geographically separated service providers to serve the device based on the obtained geographic information; and
- means for routing the received message to the identified service provider, wherein obtained geographic location information is embedded in the received message; and
- means for exchanging point-to-point text-based messages between the device and the identified service provider, wherein the point-to-point text-based messages comprise customizable messages that communicate information other than confirmation of receipt of user messages.

9. The system of claim 8 wherein the message is a short messaging service (SMS) message, multimedia messaging service (MMS) message, electronic mail message, an instant message (IM), or a prerecorded voice message.

10. The system of claim 8 wherein the previously defined numeric or alphanumeric string is 435763, 728363, 63334357, or 4658733.

11. The system of claim 8 wherein the means for routing includes routing the obtained location information to the identified service provider.

12. The system of claim 8 wherein the means for identifying includes means for identifying a routing number, telephone number or short code associated with the identified service provider, and wherein the means for forwarding includes means for forwarding the message based on the identified routing number, telephone number or short code.

13. The system of claim 8 wherein the means for identifying includes means for querying a database for latitude and longitude coordinates associated with street addresses for equipment in communication with the device, wherein the equipment includes a femtocell, picocell or a WiFi access point.

14. The system of claim 8 wherein the request for a service is selected from a plurality of different types of requests for a service, and wherein the geographic location information is determined via a Gateway Mobile Location Center (GMLC).

15. A system for establishing messaging communication between a device and a service provider, the system comprising:
- a messaging server operable to receive a messaging request from a device, the messaging request having an associated short code string used to determine whether the message request is a request to be routed to a service provider,
  - wherein the messaging request is selected from a plurality of different types of messaging requests, and
  - wherein the short code string has more than 3 digits or characters;
- a device locator operable to obtain location information of the device,
  - wherein the location information is determined via a Gateway Mobile Location Center (GMLC);
- a database to store coverage regions of respective service providers and associated service provider routing numbers; and
- a location center operable to identify one of the respective service providers and the associated routing number stored in the database that serves the device, based on the location information of the device,
  - wherein the messaging server forwards the message request to the identified service provider via the associated service provider routing number, and
  - wherein the location information of the device is included with the message request.

16. The system of claim 15 wherein the messaging request from the device is at least one of a short messaging service (SMS) message, multimedia messaging service (MMS) message, electronic mail message, an instant message (IM), and Morse code message.

17. The system of claim 15 wherein the associated service provider routing number is at least one of a short code, telephone number, and an electronic mail address.

18. The system of claim 15 wherein the associated short code string is "HELPME", "SAVEME", "NEEDHELP", or "INJURED".

19. The system of claim 15 wherein the device locator performs a querying of a database for latitude and longitude coordinates associated with street addresses for customer premises wireless equipment in communication with the mobile telecommunications device, wherein the customer premises equipment includes a femtocell, a picocell or an IEEE 802.11 access point.

20. A method of forwarding messages received from a device to a service provider, the method comprising:
- determining whether a received message is addressed to initiate a messaging session with a service provider,
  - wherein the received message is associated with a user-input numeric string address or alphanumeric string address,
  - wherein the received message and the user-input numeric string address or alphanumeric string address are received from a device,
  - wherein the user-input numeric string address or alphanumeric string address is a mobile phone short code having more than 3 digits or characters,
  - wherein the determining includes identifying whether the user-input numeric string address or alphanumeric string address is substantially similar to a previously defined numeric address or alphanumeric string address,
  - wherein neither the user-input numeric string address or alphanumeric string address nor the previously defined numeric string address or alphanumeric string address are a phone number, and
  - wherein the received message is selected from a plurality of different types of received messages;
- obtaining geographic location information associated with a geographic location of the device;

identifying a service provider that serves the device based on the obtained geographic information; and forwarding the message to the service provider, wherein the obtained geographic location information is included with the message; and after the forwarding, exchanging point-to-point text-based messages between the device and the service provider, wherein the point-to-point text-based messages comprise customizable messages that communicate information other than confirmation of receipt of user messages.

21. The method of claim 20 wherein the message is a short messaging service (SMS) message, multimedia message service (MMS) message, electronic mail message, or an instant message (IM).

22. The method of claim 20 wherein the previously defined numeric string address or alphanumeric string address is 435763.

23. The method of claim 20 wherein the forwarding comprises forwarding the obtained location information to the service provider.

24. The method of claim 20, further comprising, after the forwarding, routing the obtained location information to the service provider.

25. The method of claim 20 wherein the identifying includes identifying a routing number, telephone number or short code associated with the service provider, and wherein the forwarding includes forwarding the message based on the identified routing number, telephone number or short code.

26. The method of claim 20 wherein the identifying includes querying a database for latitude and longitude coordinates associated with street addresses for equipment in communication with the device, wherein the equipment includes a femtocell, a picocell, an IEEE 802.11 access point or a router.

27. The method of claim 20, further comprising automatically correcting the user-input numeric string address or alphanumeric string address to be a same address as the previously defined numeric address or alphanumeric string address, in response to the user-input numeric string address or alphanumeric string address being substantially similar to the previously defined numeric address or alphanumeric string address.

28. The method of claim 20, further comprising:
detecting an erroneous entry of the user-input numeric string address or alphanumeric string address; and
automatically correcting the erroneous entry to initiate the messaging session with the service provider.

29. The method of claim 20, further comprising translating the user-input numeric string address or alphanumeric string address into the previously defined numeric address or alphanumeric string address, in response to the user-input numeric string address or alphanumeric string address being a respective one of alternate addresses used to initiate the messaging session with the service provider.

30. The method of claim 20 wherein the geographic location information is determined via a Gateway Mobile Location Center (GMLC).

* * * * *